(12) United States Patent
Hansen et al.

(10) Patent No.: US 10,590,569 B2
(45) Date of Patent: Mar. 17, 2020

(54) ULTRA-RESILIENT FABRIC

(75) Inventors: Robert A. Hansen, North Muskegon, MI (US); Bjorn Rydin, Horby (SE); William Luciano, Saratoga Springs, NY (US)

(73) Assignee: Albany International Corp., Rochester, NH (US)

( * ) Notice: Subject to any disclaimer, the term of this patent is extended or adjusted under 35 U.S.C. 154(b) by 1139 days.

(21) Appl. No.: 12/479,317

(22) Filed: Jun. 5, 2009

(65) Prior Publication Data

US 2010/0129597 A1 May 27, 2010

Related U.S. Application Data

(63) Continuation-in-part of application No. 12/345,466, filed on Dec. 29, 2008.
(Continued)

(51) Int. Cl.
*B32B 5/12* (2006.01)
*D03D 7/00* (2006.01)
(Continued)

(52) U.S. Cl.
CPC ............. *D03D 7/00* (2013.01); *B32B 5/026* (2013.01); *B32B 5/12* (2013.01); *B32B 5/26* (2013.01); *B32B 7/03* (2019.01); *D03D 1/0094* (2013.01); *D03D 11/00* (2013.01); *D03D 13/004* (2013.01); *D03D 15/0044* (2013.01); *D03D 15/0083* (2013.01); *D03D 15/08* (2013.01); *D21F 1/0036* (2013.01); *D21F 3/0227* (2013.01); *D21F 7/083* (2013.01); *D21F 7/086* (2013.01);
(Continued)

(58) Field of Classification Search
CPC ............ B32B 2250/03; B32B 2250/20; B32B 2250/24; B32B 2250/40; B32B 2262/0292; B32B 2305/10; B32B 2307/56; B32B 2413/00; B32B 2433/02; B32B 2433/04; B32B 5/12
USPC ......... 442/50, 328, 329, 334, 335, 338, 366, 442/381, 389, 392, 414, 415, 416
See application file for complete search history.

(56) References Cited

U.S. PATENT DOCUMENTS 2,919,217 A * 12/1959 Bobkowicz ................... 428/108
2,919,467 A * 1/1960 Mercer ............... B29C 47/0033
156/167
(Continued)

FOREIGN PATENT DOCUMENTS

CN 1914373 B 5/2010
DE 42 02 325 A 8/1993
(Continued)

OTHER PUBLICATIONS

Definition "loom" Complete Textile Glossary, Celanese Acetate LLC, Copyright 2001 (no month).*
(Continued)

*Primary Examiner* — Andrew T Piziali
(74) *Attorney, Agent, or Firm* — McCarter & English, LLP

(57) ABSTRACT

A structure for use in industrial fabrics such as paper machine clothing and engineered fabrics is disclosed. The structure includes axially and radially elastic hollow members, and relatively inelastic yarns in various patterns. The structure has a high degree of both compressibility under an applied normal load and excellent recovery (resiliency or spring back) upon removal of that load.

11 Claims, 11 Drawing Sheets

Related U.S. Application Data

(60) Provisional application No. 61/017,484, filed on Dec. 28, 2007.

(51) Int. Cl.

| | | |
|---|---|---|
| *D03D 15/00* | (2006.01) | |
| *B32B 5/26* | (2006.01) | |
| *D21F 3/02* | (2006.01) | |
| *D21F 7/08* | (2006.01) | |
| *D03D 11/00* | (2006.01) | |
| *D03D 15/08* | (2006.01) | |
| *D03D 1/00* | (2006.01) | |
| *D21F 1/00* | (2006.01) | |
| *D03D 13/00* | (2006.01) | |
| *B32B 5/02* | (2006.01) | |
| *B32B 7/03* | (2019.01) | |
| *B65G 15/34* | (2006.01) | |

(52) U.S. Cl.
CPC ....... *B32B 2250/03* (2013.01); *B32B 2262/02* (2013.01); *B32B 2262/0292* (2013.01); *B32B 2307/51* (2013.01); *B32B 2307/514* (2013.01); *B65G 15/34* (2013.01); *D10B 2401/046* (2013.01); *Y10T 428/24074* (2015.01); *Y10T 442/30* (2015.04)

(56) References Cited

U.S. PATENT DOCUMENTS

| | | | | |
|---|---|---|---|---|
| 3,095,258 | A * | 6/1963 | Scott | D01D 5/24 264/177.13 |
| 3,316,136 | A * | 4/1967 | Pufahl | D06M 17/00 156/160 |
| 3,384,692 | A * | 5/1968 | Galt | B29C 47/0033 156/167 |
| 3,537,928 | A * | 11/1970 | Maglio | D06N 3/005 156/220 |
| 3,553,857 | A | 1/1971 | Isham et al. | |
| 3,630,824 | A * | 12/1971 | Rohlig | D01D 5/24 264/209.5 |
| 3,723,218 | A * | 3/1973 | Gaffney | B29C 47/0033 156/167 |
| 3,733,721 | A | 5/1973 | Clemens | |
| 3,815,645 | A | 6/1974 | Codorniu | |
| 4,088,805 | A * | 5/1978 | Wiegand | B29C 44/12 442/370 |
| 4,323,622 | A * | 4/1982 | Gladh et al. | 442/324 |
| 4,328,840 | A * | 5/1982 | Fontana | 139/419 |
| 4,328,841 | A * | 5/1982 | Fontana | 139/419 |
| 4,350,731 | A | 9/1982 | Siracusano | |
| 4,555,440 | A | 11/1985 | Crook | |
| 4,569,874 | A * | 2/1986 | Kuznetz | 428/109 |
| 4,569,883 | A * | 2/1986 | Renjilian | 442/194 |
| 4,608,768 | A | 9/1986 | Cavanagh | |
| 4,781,967 | A | 11/1988 | Legge et al. | |
| 4,791,863 | A * | 12/1988 | Vahatalo | 100/35 |
| 4,870,998 | A * | 10/1989 | Westhead | 139/383 A |
| 4,931,358 | A | 6/1990 | Wahl et al. | |
| 4,979,543 | A | 12/1990 | Moriarty et al. | |
| 5,087,327 | A | 2/1992 | Hood | |
| 5,360,656 | A | 11/1994 | Rexfelt et al. | |
| 5,368,696 | A | 11/1994 | Cunnane, III et al. | |
| 5,401,564 | A | 3/1995 | Lee et al. | |
| 5,436,052 | A * | 7/1995 | Basse | B21F 27/20 428/105 |
| 5,480,646 | A | 1/1996 | Vu | |
| 5,560,401 | A * | 10/1996 | Miglus | 139/383 R |
| 5,597,450 | A | 1/1997 | Baker et al. | |
| 5,732,749 | A | 3/1998 | Fargeout | |
| 6,001,460 | A * | 12/1999 | Morman | B32B 5/04 428/195.1 |
| 6,039,821 | A | 3/2000 | Buck | |
| 6,146,499 | A * | 11/2000 | Lin et al. | 162/197 |
| 6,158,576 | A * | 12/2000 | Eagles | B65G 43/02 198/810.01 |
| 6,179,965 | B1 | 1/2001 | Cunnane, III et al. | |
| 6,391,420 | B1 * | 5/2002 | Cederblad et al. | 428/107 |
| 6,413,889 | B1 | 7/2002 | Best et al. | |
| 6,630,223 | B2 * | 10/2003 | Hansen | 428/131 |
| 6,723,208 | B1 | 4/2004 | Hansen | |
| 2002/0072290 | A1 | 6/2002 | Johnson | |
| 2002/0100572 | A1 | 8/2002 | Cunnane, III | |
| 2002/0162246 | A1 | 11/2002 | Mayer et al. | |
| 2003/0217484 | A1 | 11/2003 | Christensen et al. | |
| 2003/0228815 | A1 | 12/2003 | Bhatnagar et al. | |
| 2004/0005832 | A1 | 1/2004 | Neculescu et al. | |
| 2004/0023582 | A1 | 2/2004 | Espe | |
| 2004/0219854 | A1 | 11/2004 | Groitzsch et al. | |
| 2005/0081570 | A1 | 4/2005 | Karlsson et al. | |
| 2006/0029772 | A1 | 2/2006 | Huang et al. | |
| 2006/0278328 | A1 | 12/2006 | Westerkamp et al. | |
| 2007/0163741 | A1 | 7/2007 | Crook | |
| 2007/0194490 | A1 | 8/2007 | Bhatnagar et al. | |
| 2007/0202314 | A1 | 8/2007 | Youn et al. | |
| 2008/0166533 | A1 | 7/2008 | Jones et al. | |
| 2009/0176427 | A1 | 7/2009 | Hansen et al. | |
| 2009/0181590 | A1 | 7/2009 | Hansen et al. | |
| 2010/0129597 | A1 | 5/2010 | Hansen et al. | |
| 2012/0189806 | A1 | 7/2012 | Hansen et al. | |

FOREIGN PATENT DOCUMENTS

| | | |
|---|---|---|
| DE | 10 2004 038770 | 2/2006 |
| EP | 0306313 A | 3/1989 |
| EP | 0505788 A | 3/1992 |
| EP | 1302578 A | 4/2003 |
| EP | 1386723 A | 2/2004 |
| EP | 1568808 A | 8/2005 |
| EP | 1 719 834 A | 11/2006 |
| GB | 1118784 | 7/1968 |
| GB | 2197886 A | 6/1988 |
| JP | 06-135455 A | 5/1994 |
| JP | 2003-193326 A | 7/2003 |
| KR | 2000-0064842 A | 11/2000 |
| WO | WO 93/17180 A | 9/1993 |
| WO | WO 2004/005018 A | 1/2004 |
| WO | WO 2004/072368 A | 8/2004 |
| WO | WO 2005/075734 A | 8/2005 |
| WO | WO 2007/067949 A | 6/2007 |
| WO | WO 2009/086533 A | 7/2009 |
| WO | WO 2010/030298 A | 3/2010 |

OTHER PUBLICATIONS

BPAI Decision on Appeal, U.S. Appl. No. 10/699,997, mailed Dec. 19, 2011.*

Definition "laminated" Merriam-Webster Dictionary, https://www.merriam-webster.com/dictionary/laminated, (no date).*

Definition of "Needle Loom" Complete Textile Glossay, Celanese Acetate, 2001.*

Definition of "soft" Webster's New World College Dictionary, Wiley Publishing, 2010.*

International Search Report and Written Opinion from EPO for PCT/US2008/088478 dated Jul. 2, 2009.

International Search Report and Written Opinion from EPO for PCT/US2008/088450 dated Apr. 15, 2009.

International Search Report and Written Opinion from EPO for PCT/US2010/036398 dated Sep. 15, 2010.

International Search Report and Written Opinion from EPO for PCT/US2010/036385 dated Oct. 7, 2010.

International Search Report and Written Opinion from International Application PCT/US2012/022029.

International Search Report and Written Opinion from International Application PCT/US2012/022035.

Notification of First Office Action, including search report, issued by Chinese Patent Office for corresponding Chinese application 201280009844.1 dated Sep. 3, 2014, English translation only.

(56) References Cited

OTHER PUBLICATIONS

Dell'Isola, Francesco et al.: "A Two-Dimensional Gradient-Elasticity Theory for Woven Fabrics", *Journal of Elasticity, The Physical and Mathematical Science of Solids*, Jan. 2015, pp. 113-125, vol. 118, No. 1.

Gu, Huang: "Tensile behaviours of woven fabrics and laminates", *Materials and Designs*, 2007, pp. 704-707, vol. 28, issue 2.

Homaeigohar, Seyed Shahin et al.: "Novel compaction resistant and ductile nanocomposite nanofibrous microfiltration membranes", *Journal of Colloid and Interface Science*, Apr. 15, 2012, pp. 6-15, vol. 372.

Gonca, V. et al.: "Theoretical and Experimental Studies of Stiffness Properties of Laminated Elastomeric Structures", presented at $9^{th}$ International DAAAM Baltic Conference "Industrial Engineering", Apr. 24-26, 2014 in Tallinn, Estonia, pp. 342-347.

Woodford, Chris, "Composites and laminates", *EXPLAINTHATSTUFF!*, Jul. 13, 2015, http://www.explainthatstuff.com/composites.html ; accessed on Nov. 20, 2015.

"Non Wovens and Laminates Make Their Way Into Press Felts", *Pulp & Paper Canada*, Feb. 29, 2000, http://www.pulpandpapercanada.com/innovation/non-wovens-and-laminates-make-their-way-into-press-felts-1000107127 ; accessed on Nov. 20, 2015.

"Woven Fabrics", *NetComposites Now*, published courtesy of David Cripps, Gurit, http://www.netcomposites.com/guide-tools/guide/reinforcements/woven-fabrics/ , accessed on Nov. 20, 2015.

Kaw, Autar K.: *Mechanics of Composite Materials $2^{nd}$ Ed.*, 2006, pp. 52-53, Taylor and Francis Group. https://books.google.com/books?id=MwLBQAAQBAJ&pg=PA53&Ipg=PA53&dq=%22what+is+a+laminate%22+-floor&source=bl&ots=0RHWB8ye64&sig=cDYgwIdYguJag18GoXdiG4ZLQIM&hl=en&sa=X&ved=0CCMQ6AEwAWoVChMI3_-p9pCdyQIVzLIeCh22CABs#v=onepage&q=%22what%20is%20a%20laminate%22%20-floor&f=false.

\* cited by examiner

ULTRA-RESILIENT FABRIC

CROSS-REFERENCE TO RELATED APPLICATION

This application is a continuation-in-part of U.S. application Ser. No. 12/345,466 filed Dec. 29, 2008, which claims priority of U.S. Provisional Patent Application Ser. No. 61/017,484 filed Dec. 28, 2007, the entire disclosures of which are incorporated herein by reference.

FIELD OF THE INVENTION

The present invention relates to structures for use in industrial fabrics such as paper machine clothing and engineered fabrics. More specifically, the structures include hollow elastic members, which may be compressible in a thickness or radial direction and resilient in a length or axial direction, and relatively inelastic functional yarns in various patterns. Such structures have a high degree of both compressibility under an applied normal load and excellent recovery (resiliency or spring back) upon removal of that load.

BACKGROUND OF THE INVENTION

Industrial fabrics means an endless structure in the form of a continuous loop such as one used as a forming, press or dryer fabric (paper machine clothing or PMC) as well as a process belt such as a shoe press, calendar, or transfer belt used on a paper machine. Industrial fabrics also means a fabric used in textile finishing processes. Industrial fabrics also include other endless belts where a high degree of compressibility and resiliency is required.

While the discussion herein concerns for the most part the papermaking process in general, the application of the invention is not considered limited thereto.

In this regard, during the papermaking process, for example, a cellulosic fibrous web is formed by depositing a fibrous slurry, that is, an aqueous dispersion of cellulose fibers, onto a moving forming fabric in a forming section of a paper machine. A large amount of water is drained from the slurry through the forming fabric, leaving the cellulosic fibrous web on the surface of the forming fabric.

The newly formed cellulosic fibrous web proceeds from the forming section to a press section, which includes a series of press nips. The cellulosic fibrous web passes through the press nips supported by a press fabric, or, as is often the case, between two such press fabrics. In the press nips, the cellulosic fibrous web is subjected to compressive forces which squeeze water therefrom, and which adhere the cellulosic fibers in the web to one another to turn the cellulosic fibrous web into a paper sheet. The water is accepted by the press fabric or fabrics and, ideally, does not return to the paper sheet.

The paper sheet finally proceeds to a dryer section, which includes at least one series of rotatable dryer drums or cylinders, which are internally heated by steam. The newly formed paper sheet is directed in a serpentine path sequentially around each in the series of drums by a dryer fabric, which holds the paper sheet closely against the surfaces of the drums. The heated drums reduce the water content of the paper sheet to a desirable level through evaporation.

It should be appreciated that the forming, press and dryer fabrics all take the form of endless loops on the paper machine and function in the manner of conveyors. It should further be appreciated that paper manufacture is a continuous process which proceeds at considerable speeds. That is to say, the fibrous slurry is continuously deposited onto the forming fabric in the forming section, while a newly manufactured paper sheet is continuously wound onto rolls after it exits from the dryer section.

Base fabrics, which form an important portion of the above discussed fabrics, take many different forms. For example, they may be woven either endless or flat and subsequently rendered into endless form with a woven seam using one or more layers of machine direction (MD) and cross machine direction (CD) yarns. Also such fabrics may employ what is referred to as a pin seam also formed from MD yarns to allow installation on the paper machine. Further, the base fabrics may be laminated by placing one base fabric within the endless loop formed by another base fabric, and joining or laminating them together by various means known to those skilled in the art such as by needling staple fiber batt through both base fabrics to join them to one another.

In paper machine clothing (PMC) especially press fabrics used in the press section of a paper machine, the fabric has one or more "base structures" formed from yarns and staple fiber batt needled into usually at least the sheet contact surface. The press fabric has an initial thickness, mass, and consequent void volume (the calculated volume based upon this mass and thickness) which equates to water handling capacity. They also have a measurable contact area.

Since press fabrics are subjected to normal loads (normal to the fabric plane in use) as it passes through one or more press nips, the fabric has a compressed void volume and surface contact area as well. While there have been various attempts to change the degree of compressibility, press fabrics become progressively thinner over time and millions of nip cycles. Eventually they must be removed due to various reasons such as lack of water handling capability, marking, or press vibration. When they have reached the end of their useful lifetime they must be removed and replaced with a new fabric.

New fabrics also go through a break in period wherein the density is not ideal and water handling is less than optimum. Accordingly, an ideal press fabric is one that has near constant or steady state performance (for example water handling capability) from day one until it is removed from the paper machine.

Various attempts have been made to affect press fabric properties, especially compressibility and resiliency. One attempt has been to introduce "elastic" yarns into structures. One example of this is seen in PCT application WO 2004/072368 A1. There are shortcomings to this approach however. The compressibility is only due to the elastic portion (in the through thickness direction) of the yarn, and is therefore limited to such. While larger yarns can be used, there is eventually a diminishing return on performance. Also large yarns are heavy, and can cause objectionable sheet marking. If the yarn is a sheath/core type, there is always the danger of delamination of the sheath from the core. Finally, the degree of compressibility is limited to a maximum of some fraction of the yarn diameter.

Another example is U.S. Patent application 2007/0163741 A1 which incorporates an array of compressible sheath/core yarns attached to the backside of a seamed press fabric. It is taught that the sheath is elastomeric, and can provide vibration dampening effects. It further teaches that the yarn core alone can be 200 to 2000 denier, and a total size of 0.30 to 1.2 mm in diameter. Such yarn sizes can be limited in use due to weight and potential marking considerations.

A further example is taught in U.S. Pat. No. 4,350,731 which teaches the use of wrapped yarns to make a compressible press fabric structure. Again the degree of compressibility and recovery is due to only the elastomeric wrapping sheath layers.

Another example of this type of structure is taught in GB 2 197 886. This patent discloses compressible yarns which alternated in some manner with functional (tensile) load bearing yarns to provide, under an applied normal load, a dense, quasi-single layer base structure without "knuckles" and with long weave floats to provide a quasi-crossless base construction.

Yet another example is disclosed in U.S. Pat. No. 5,087,327 to Hood, which relates to a composite yarn for use in a papermaker's fabric. The composite yarn includes a soluble core surrounded by a layer of non-soluble monofilament.

Yet another example is disclosed in U.S. Pat. No. 5,597,450, which relates to a paper machine dryer fabric including hollow thermoplastic monofilaments in the cross-machine direction.

A further example is disclosed in U.S. Publication No. 2002/0100572, which relates to a papermaking fabric having beam construction yarns that resist lateral, vertical and torsional deflection as well as compression when interwoven. The yarns are non-circular in cross-section, such as I-beam, H-beam, and box-beam.

A further example is a structure taught in U.S. Pat. No. 4,781,967. Such a structure is defined to be relatively incompressible as the stacked yarn arrays do not compress nor move relative to any other layer. In other words, when there is an applied load normal to the plane of the structure, there is little thickness change, except for any yarn deformation which is permanent. If an elastomeric (in the yarn thickness direction) is employed as the yarns in an entire layer, the compressibility of the structure is limited to some portion of that yarn diameter.

Yet another example is taught in U.S. Pat. No. 4,555,440. Again this structure is considered incompressible as there is little through thickness change when a normal load is applied or removed.

Incorporating "elastic" (in the thickness or radial direction) yarns into fabrics has affected to some degree the resiliency or spring back of these fabric structures once the normal load is removed. But again, using these yarns, the compressibility and spring back is limited to some portion of the yarn diameter at most.

As stated above, because of this limited resiliency, press fabrics have a relatively high void volume to handle water when new, more than is ideally required. They will compact and reach an optimum performance level for a period of time. However as they have limited resiliency, they will continue to compact, eventually requiring removal and replacement.

SUMMARY OF THE INVENTION

Accordingly, it is a principal object of the present invention to provide a base structure that is substantially more compressible and resilient than those of the prior art, and that maintains its compressibility and resiliency through its entire lifetime.

In this regard, the instant invention provides for a base support structure that combines hollow elastic members with excellent compressibility and resiliency with relatively inelastic functional yarns in several types of patterns, for use as at least a layer of a base support structure in PMC, industrial process belts, textile finishing belts, and other belts that require a high degree of compressibility and resiliency.

A hollow member that is defined as elastic in its thickness or radial direction and length or axial direction is required for all the embodiments discussed. The hollow elastic member can have any form as appropriate for the application and can be, for example, single monofilament, plied monofilament or multifilament, wrapped member of different materials, multicomponent member, knitted member, twisted member, or braided. The hollow elastic members can be partially composed of an elastic material, such as a multicomponent member where one component is the elastic material, or the hollow elastic member can be wholly comprised of the elastic material. The hollow elastic member may have a circular or non-circular cross sectional shape. The non-circular cross sectional shapes may include, but are not limited to, square, rectangular, triangular, elliptical, trapezoidal, polygonal, and lobate shapes. The hollow elastic member can have one or more holes running along its length or axial direction, and the holes themselves can have a circular or non-circular cross sectional shape including square, rectangular, triangular, elliptical, trapezoidal, polygonal, and lobate shapes, and can be of any suitable size. Examples of good elastic materials include, but are not limited to, polymers such as polyurethane, rubber or that sold under trademarks Lycra® by Invista or Estane® by Lubrizol.

A first embodiment employs a structure in its simplest form described as follows. Layer (1), which is the uppermost layer, is an array of parallel functional yarns. Functional yarns can include any type of yarn as known by ordinarily skilled artisans. For example, if they are oriented in the machine or running direction, they can be tensile load bearing yarns. They can again be of any size, shape, material or form as required for the particular application known to those skilled in the art. For a press fabric structure, polyamide would be a desired polymer choice. The next layer (2) is a parallel array of members oriented orthogonal or 90 degrees to the yarn layer (1). These are the required hollow elastic members. The third layer (3) is also a parallel array of functional yarns that are located on the opposite side of layer (2) and are oriented orthogonal to layer (2). However, the yarns in layer (3) are arranged such that each layer (3) yarn lines up with the space between two adjacent layer (1) yarns. In other words, this design can be classified as "crossless" in that the yarns and members in the MD and CD do not interweave with each other, but are stacked orthogonal to each other and lie in separate planes. These arrays are held together in some manner. For instance, they can be attached to a fibrous layer as taught in the aforementioned U.S. Pat. No. 4,781,967, the entire content of which is incorporated herein by reference, or the yarns/members in one layer can be attached to the yarns/members in an adjacent layer at the point where they touch via use of glues, adhesives, or a thermal fusion/welding method as known to those skilled in the art.

Note yarn systems (1) and (3) can be the same as each other or they can be different in terms of material, form, shape, etc. It is only required that the yarns in layer (3) are spaced to fit between adjacent yarns of layer (1) or vice versa.

Also note there does not have to be a one to one relationship between the number of yarns of layers (1) and (3), and the number of yarns in layer (3) can be only a fraction of the number of yarns in layer (1) or vice versa. For example, layer (3) may contain only half the yarns of layer (1) so that there are spaces between the yarns of layer (3) in use, creating additional void volume/waterhandling/water removal capability. Another embodiment is the same as that described above, but with woven binder yarns that may be alternated with the hollow elastic members in layer (2). Binder yarns may be in the MD instead, or in both MD and CD. Batt may then be applied to this structure at least on the sheet contact side by methods known to those skilled in the art.

Accordingly described herein is a compressible resilient industrial fabric that comprises a plurality of substantially parallel cross-machine direction (CD) yarns/members and a plurality of substantially parallel machine direction (MD) yarns/members. Any number of these yarns/members, in either or both CD and MD, can include an axially and radially elastic material. All the members of one layer, however, must be the hollow elastic members described above, except for the binder yarns, which may be alternated with the hollow elastic members in that layer. For example, in a MD/CD/MD configuration, all the CD members must be the hollow elastic members, with or without the alternating binder yarns. The fabric can comprise a first layer of the parallel functional yarns running in either the CD or the MD direction; a second layer of the parallel members on one side of the first layer, the second layer's members running in the CD or MD direction different from that of the first layer and comprising the hollow elastic members with excellent compressibility and resiliency; and a third layer of the parallel functional yarns on the opposite of the second layer as the first layer and running in the same direction as those of the first layer. The parallel yarns of the third layer are aligned such that they nest between the spaces created between the parallel yarns of the first layer. The fabric can comprise a binder yarn system. In the compressible resilient fabric, the number of yarns in the third layer can be less than the number of yarns in the first layer. The hollow elastic members of the second layer can also be orthogonal to those of the first and third layers. In the fabric, the hollow elastic members of the second layer can be at an angle of less than 90 degrees of the first and third layer, such as an angle of 45 degrees.

The fabric of can also include a fourth layer of parallel hollow elastic members in the same direction as the second layer, which include the hollow elastic material, and a fifth layer of parallel functional yarns in the same direction as the first layer, wherein the functional yarns of the fifth layer are aligned in the same vertical plane in a through thickness direction as that of the first layer.

In another embodiment, the fabric can include a laminated structure. For example, the fabric can comprise two independently woven fabric layers with a hollow elastic member layer/array there between. As another example, the fabric comprises a binder yarn system weaving between the two woven layers of the laminate. In another embodiment, the binder yarn system and the hollow elastic members of the fabric can be in the same direction, for example, the CD, and may be alternated with each other. In such an embodiment, the layer of hollow elastic members can be inside a double layer construction.

The resilient compressible fabric can form or be included in any number of final fabrics including: paper machine clothing, such as a forming fabric, a press fabric, a dryer fabric, a through air dryer fabric, a shoe press belt base, a calendar belt base, or a transfer belt base; an engineered fabric base; or a fabric used in the production of nonwovens by processes such as airlaid, melt blowing, spunbonding, and hydroentangling; or an industrial process belt such as a textile finishing belt, or other belts that require a high degree of compressibility and resiliency. Where the fabric is a base for a dryer fabric, the dryer fabric can include a backside or a non-sheet contact side of the fabric, the backside including angled components.

In another embodiment, the fabric is a compressible resilient industrial fabric, wherein the fabric comprises: one or more layers of a plurality of functional yarns in the machine direction (MD) and/or cross-machine direction (CD), and one or more layers of a plurality of hollow elastic (axially and radially) members interspersed between the one or more layers of a plurality of functional yarns. Any number of the MD yarns and CD yarns are interwoven to form a woven fabric. The fabric further can include a plurality of binder yarns. Also, the fabric can comprise a 2-8-shed pattern. The compressible resilient fabric can be woven into any of a flat woven fabric, an endless fabric; and an on-machine seamable fabric. In one embodiment the fabric can include a laminated structure. For example, the fabric can comprise two woven layers with the inventive compressible resilient fabric there between. As another example, the fabric can comprise binder yarns weaving between the layers of laminate. In another embodiment, the binder yarns and the hollow elastic members of the fabric can be in the same direction, for example, the CD. Binder yarns may be in the MD instead, or in both MD and CD. In such an embodiment, the layer of hollow elastic members can be inside a double layer construction. The hollow elastic members are preferably coarser (larger) than the binder yarns. Also, the fabric can comprise the hollow elastic members in the CD and the MD, wherein the binder yarns are smaller than the hollow elastic members.

The interwoven resilient compressible fabric can form or be included in any number of final fabrics including: paper machine clothing, such as a forming fabric, a press fabric, a dryer fabric, a through air dryer fabric, a shoe press belt base, a calendar belt base, or a transfer belt base; an engineered fabric base; or a fabric used in the production of nonwovens by processes such as airlaid, melt blowing, spunbonding, and hydroentangling; or an industrial process belt such as a textile finishing belt, or other belts that require a high degree of compressibility and resiliency. Where the fabric is a base for a dryer fabric, the dryer fabric can include a backside or a non-sheet contact side of the fabric, the backside including angled components.

BRIEF DESCRIPTION OF THE DRAWINGS

Thus by the present invention its objects and advantages will be realized, the description of which should be taken in conjunction with the drawings wherein.

DETAILED DESCRIPTION OF THE INVENTION

Initially although a press fabric will be discussed, as aforesaid the present invention has application to other type fabrics or belts including forming fabrics, dryer fabrics, through air dryer fabrics, shoe press belts, calendar belts, or transfer belts; engineered fabrics; or fabrics used in the production of nonwovens by processes such as airlaid, melt blowing, spunbonding, and hydroentangling; or industrial process belts such as textile finishing belts, or other belts that require a high degree of compressibility and resiliency.

Figure 12:
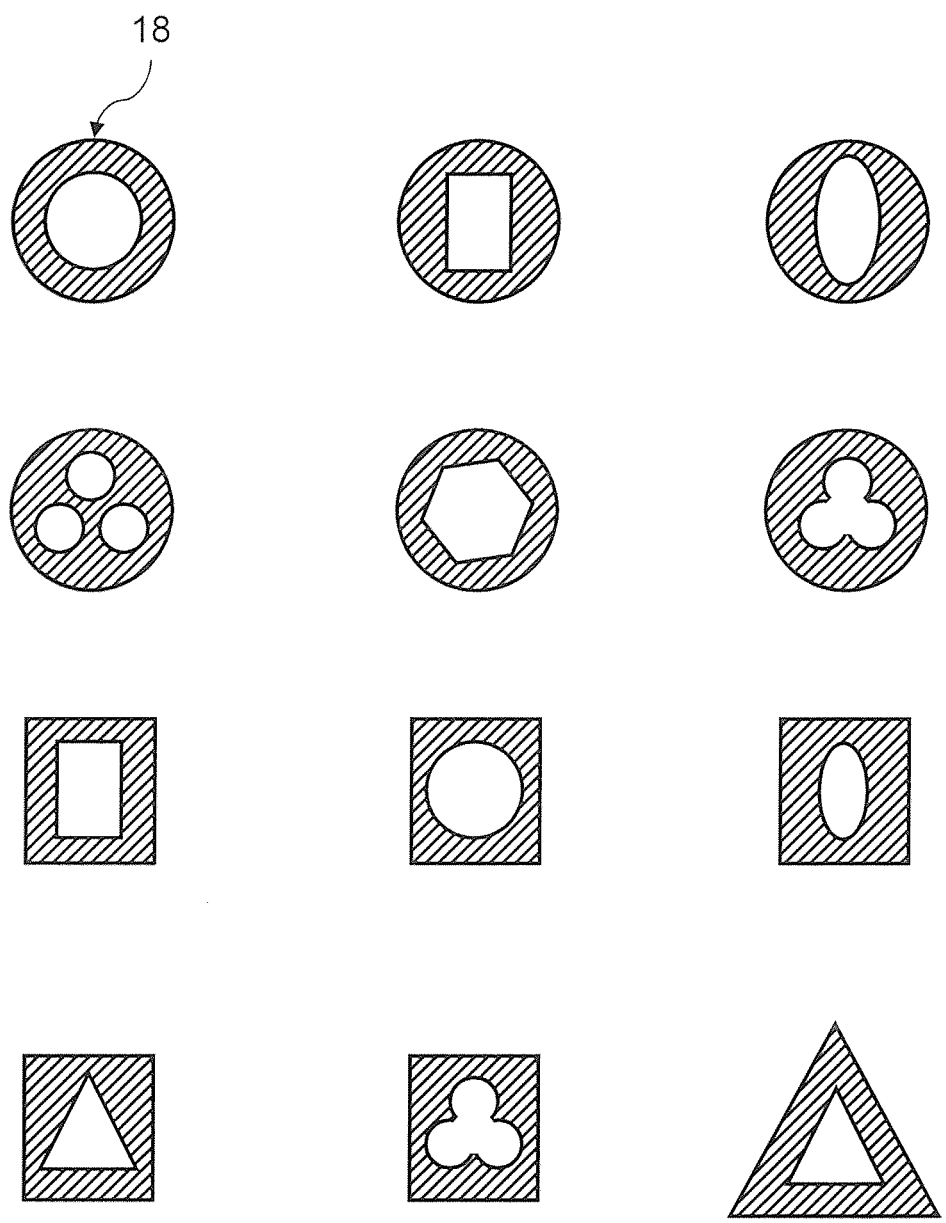
FIG. 12 shows different cross sections of the hollow elastic member of the present invention.

A hollow member that is defined as elastic in its thickness or radial direction and length or axial direction is required for all the embodiments discussed herein. The hollow elastic member can have any form as appropriate for the application and can be, for example, single monofilament, plied monofilament or multifilament, wrapped member of different materials, multicomponent member, knitted member, twisted member, or braided. The hollow elastic members can be partially composed of an elastic material, such as a multicomponent member where one component is the elastic material, or the hollow elastic member can be wholly comprised of the elastic material. The hollow elastic member may have a circular or non-circular cross sectional shape. The non-circular cross sectional shapes may include, but are not limited to, square, rectangular, triangular, elliptical, trapezoidal, polygonal, and lobate shapes. The hollow elastic member can have one or more holes running along its length or axial direction, and the holes themselves can have a circular or non-circular cross sectional shape including square, rectangular, triangular, elliptical, trapezoidal, polygonal, and lobate shapes, and can be of any suitable size. Some non-limiting examples of cross-sectional shapes for the hollow elastic member are illustrated in FIG. 12. It should be noted that the hollow elastic member of the present invention weighs less and compresses more (in a thickness direction) than an elastic member of the same outer diameter but without any hole(s) running along its length or axial direction. Examples of a few good elastic materials include, but are not limited to, polymers such as polyurethane, rubber, or that sold under trademarks Lycra® by Invista or Estane® by Lubrizol.

Figure 1:
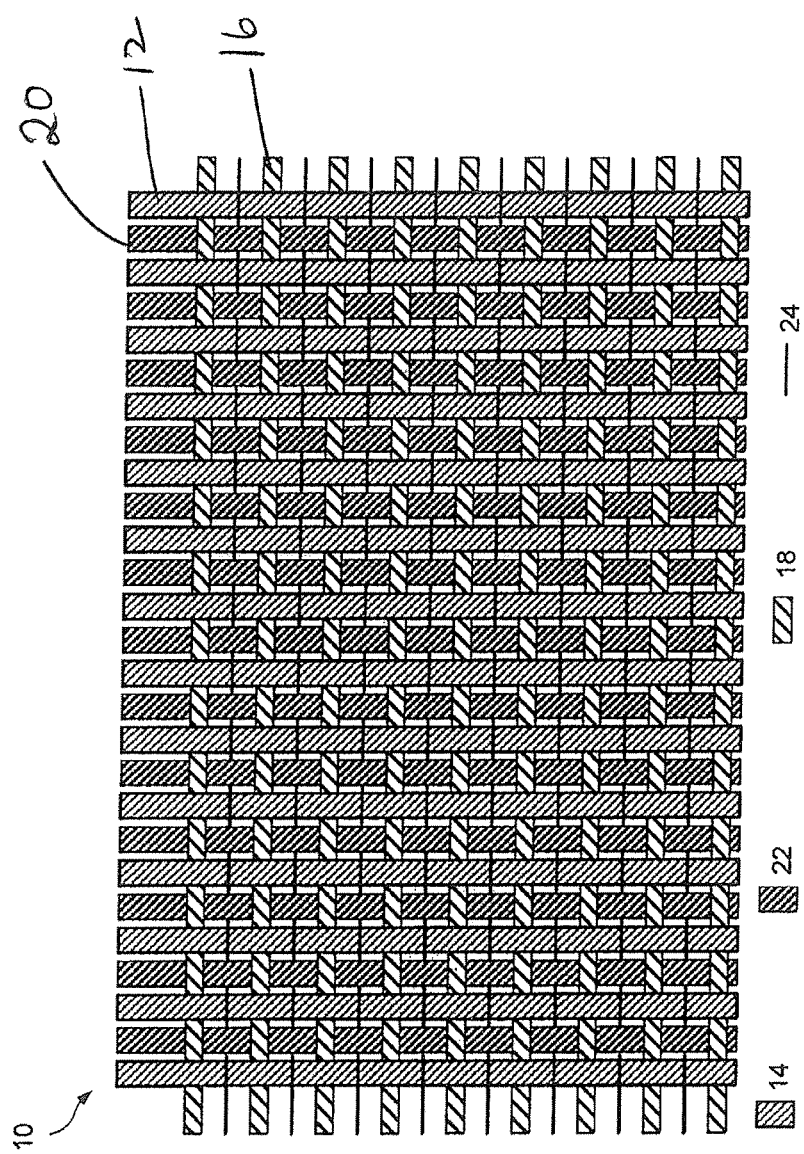
FIG. 1 is a top plan view of a fabric incorporating the teachings of the present invention.

With that said turning now more particularly to the drawings, a press fabric base structure 10 is shown for example in FIG. 1, having a first or top (1) layer 12 comprised of functional yarns 14 in a parallel array oriented in the machine or running direction. They can be of any size, shape, material or form suitable for the purpose. This applies to all the yarns referred to herein.

A second or middle (2) layer 16 of hollow elastic members 18 is provided oriented orthogonal or 90 degrees to the first layer 12. The hollow elastic members 18 have the elastic features as aforesaid.

A third or bottom (3) layer 20 comprised of functional yarns 22 is provided in the form of a parallel array orthogonal to layer 16. The yarns 22 in layer 20 are positioned or aligned within the space between yarns 14 in top (1) layer 12.

The yarns/members of adjacent layers can be attached as aforesaid in a variety of ways suitable for the purpose. A batt layer (not shown) can be applied to the top (sheet side) surface and/or the bottom surface using techniques known in the art.

Figure 2:
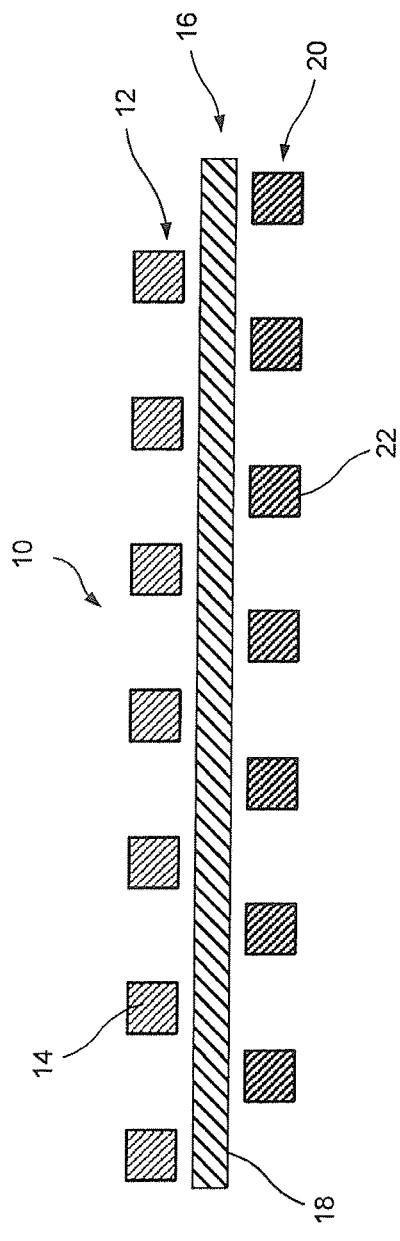
FIG. 2 is a side view of the fabric shown in FIG. 1 in an uncompressed state.
Figure 3:
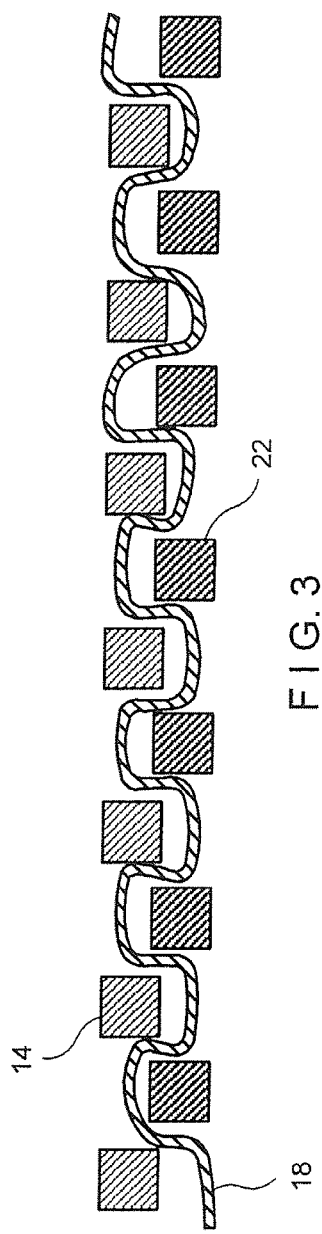
FIG. 3 is a side view of the fabric shown in FIG. 1 in a compressed state.

Upon application of a compressive load as the press fabric enters a press nip on a paper machine, the hollow elastic members 18 will stretch allowing the yarns 14 and 22 to move towards each other and to "nest" between each other, virtually almost in the same plane, as shown in FIG. 3. At this point, hollow elastic members 18 in layer 16 conform to this nesting, and bend and flatten around yarns 14, 22 in the top layer 12 and bottom layer 20. Upon release of the load as the fabric exits the nip, due to the elastic behavior of the member 18, they will cause the yarn layers 12 and 20 to move apart from each other or "spring back", returning the fabric to its desired thickness and openness as shown in FIG. 2. Therefore, a fabric having a total thickness of the thickness of yarns 14 plus the thickness of yarns 22 plus the thickness of hollow elastic member 18 under normal uncompressed state is compressible and resilient to almost an entire yarn thickness, i.e. the thickness lost is some portion of the hollow elastic member 18, and the fabric can be almost as thin as the thicker diameter of yarn 14 or 22, in a compressed state.

These properties are important as they affect: uniformity of pressure distribution under load as well as the total contact area; fast startup as the fabric compresses easily to the desired in nip void volume; vibration dampening as the structure acts as a dampening "spring"; and the quick recovery of thickness may help to minimize rewet during the expansion phase of post mid nip dewatering.

It is important to note that the member arrays of layers 12 and 20 can be oriented either in the MD or CD in the fabric in use, and so can the hollow elastic member array of layer 16. It is also important to note that although functional yarns 14, 22 are illustrated as having a square cross-section in some figures, they can be of any size, shape, material or form suitable for the purpose.

In another embodiment similar to that of the above, yarn layers 12 and 20 have the same position and relative orientation/spacing as above, but hollow elastic member layer 16 is oriented at less than 90 degree angle to layers 12 and 20, preferably at a 45 degree angle.

Another embodiment employs a similar principle as above, but the structure is made using a process as taught in co-pending U.S. application Ser. No. 11/893,874, the entire disclosure of which is incorporated herein by reference. In this embodiment, a full length, full width array of functional (e.g. tensile load bearing) MD yarns is created according to the method disclosed in the '874 application. To this array is attached another layer of the required hollow elastic members in the CD direction. These CD hollow elastic members can be orthogonal or at an angle less than 90 degrees relative to the MD yarns. When the fabric is then folded over according to the method in the application, yarn layers 12 and 20 are formed, sandwiching two layers 18 of hollow elastic members which are either stacked perpendicular and on top of each other, or crisscross each other an acute angle. The spacing of the MD yarns after folding over has to be arranged to allow the yarns to "nest," as explained in the previous embodiment. When used as a press fabric, additional batt fiber can be attached to at least one surface to further consolidate the structure.

In another embodiment, a structure is woven similar to that taught in the aforementioned U.S. Pat. No. 4,555,440, the entire disclosure of which is incorporated herein by reference. For purposes of illustration in the present application, only two layers of yarns in one direction 12 and 20, and one layer 16 of hollow elastic members in the other orthogonal direction 16 are shown in FIG. 1. The structure is held together with woven in binder yarns 24 as shown in FIG. 1. It should be noted, however, that layers 12, 16 and 20 do not weave with each other, but are only stacked on one another in an orthogonal direction. It should also be noted that the woven-in binder yarns can be either in MD or CD, and can run parallel to the hollow elastic members 18, for example, as being alternated with hollow elastic members 18, or orthogonal to the hollow elastic members 18. Yarn layers 12 and 20 are functional yarns. If they are MD yarns, one or both layers can be tensile load bearing yarns.

They can be the same or different from each other in shape, form, material, etc. Layer 16 has the hollow elastic members. Again, the spacing of yarns 14 and 22 relative to each other has to be such to allow "nesting". Binder yarns 24 can act just as binder yarns or also be functional yarns as well which for example can positively affect CD fabric stability. As in the other embodiments above when used as a press fabric for example, batt can be applied at least to one surface. Also depending on the application instead of batt a porous or non-porous film may be laminated to the structure. The structure can have a layer of coating on either or both surfaces and the coating can also partially or fully encapsulate or impregnate the entire structure.

When a load is applied normal to the fabric plane, yarn layers 12 and 20 will move towards each other and "nest," allowing compression of the base fabric to almost a full yarn diameter. More importantly, as the load is removed, the hollow elastic members 18 will "spring back," causing yarn layers 12 and 20 to move apart from one another, and causing the fabric to regain its original shape and thickness.

Figure 4A:
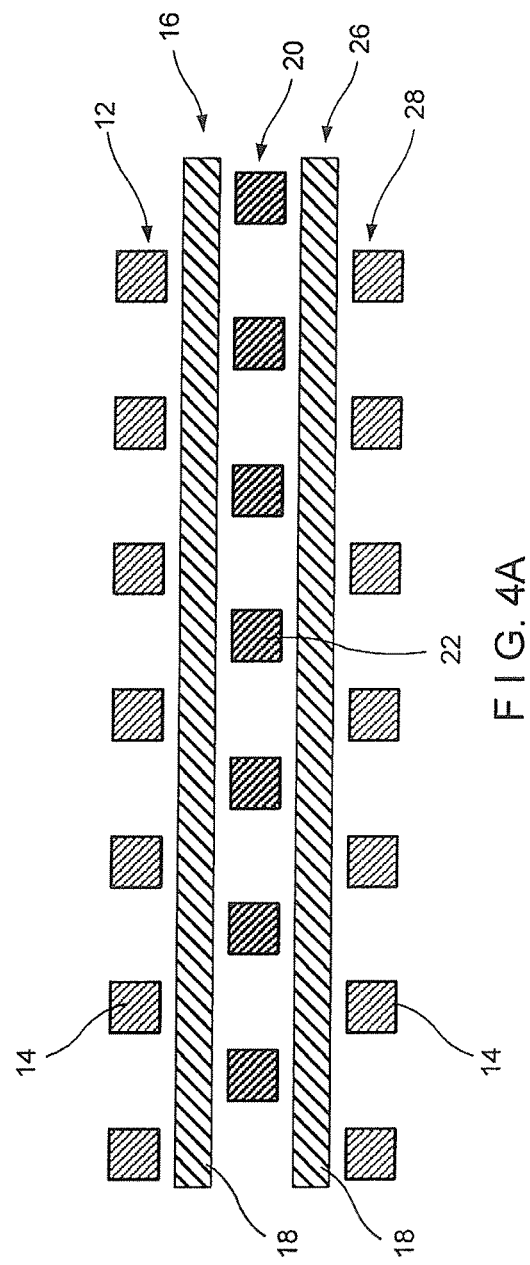
FIGS. 4A-B are a side view and a profile view of a further embodiment of the inventive fabric, respectively.
Figure 4B:
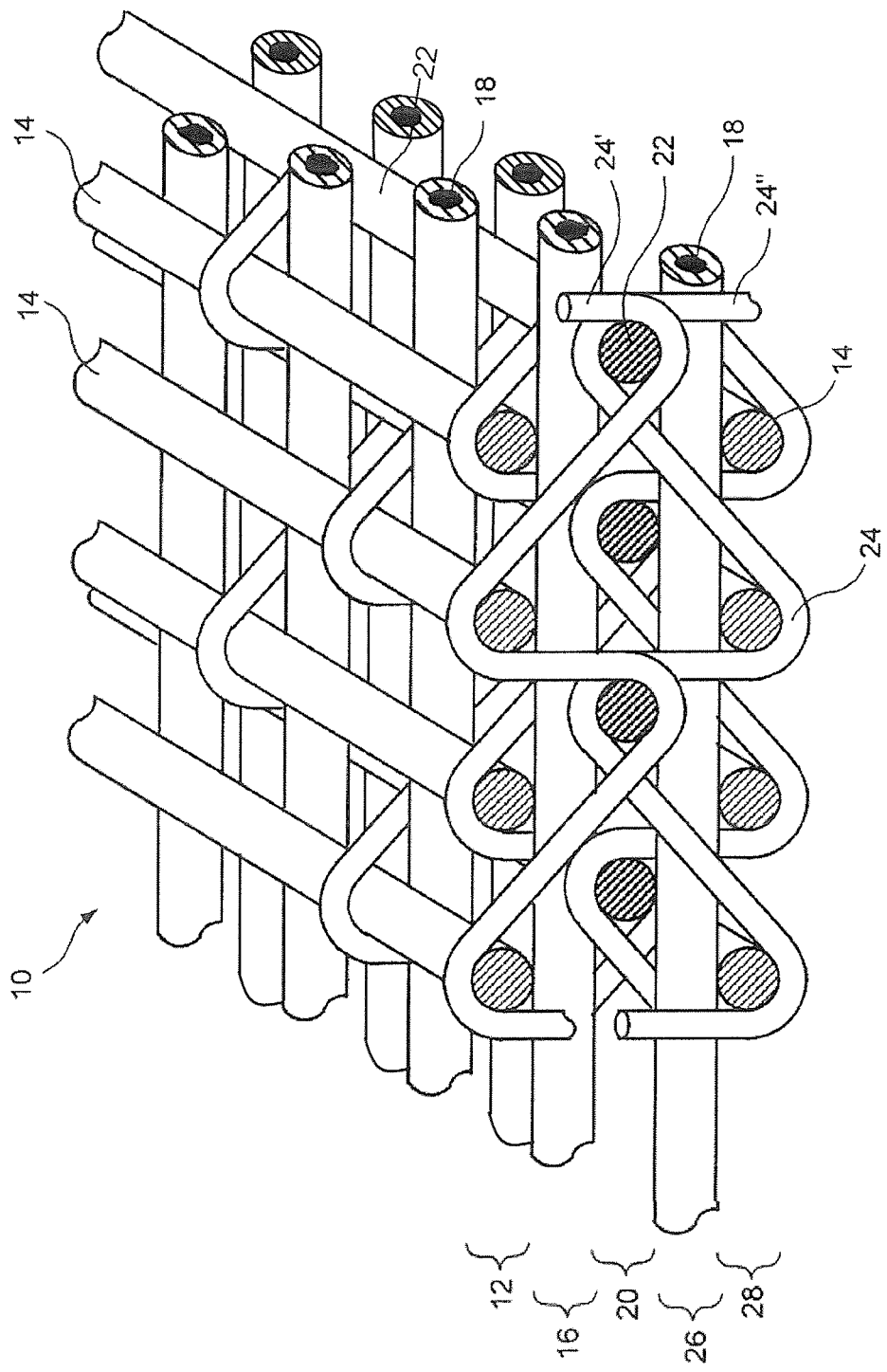

Furthermore, there can be more than two layers of functional MD yarns and more than one layer of CD yarns as shown in FIG. 4A. With three layers of MD yarns, for example, two of the three yarn layers must be spaced apart relative to each other to allow nesting. For example, top and middle layers can be oriented such that yarns in the middle layer fit in the space between two adjacent yarns of the top and yarns in the bottom layer are stacked in vertical orientation with either the top or middle layers. Furthermore, both layers in CD can include the hollow elastic members, or only one layer can include the hollow elastic members and the other layer can be a functional yarn layer to aid in CD stability or to provide a greater degree of void volume under load. Again yarns in the top, middle and bottom layers can be the same or different from each other in form, material, shape, etc. Another variant of the "crossless" woven structure is shown at FIG. 4B, in which the base substrate 10 is shown comprising five layers in generally parallel planes with each layer comprising a plurality of parallel yarns/members. The yarns of the first, third and fifth layer (i.e. layers 12, 20 and 28) are oriented in the machine direction, for example, while the hollow elastic members of the second and fourth layers (i.e. layers 16 and 26) are oriented in the cross-machine direction, for example. As shown therein, MD functional yarns 22 in the third layer 20 are spaced apart in the manner described above such they fall between the yarns 14 of the first layer 12 and the fifth layer 28, thereby causing the "nesting" described above. The second layer 16 and the fourth layer 26 include the hollow elastic members 18. The binder yarns 24 are disposed in the CD, for example, though they can be disposed in MD too. Though some embodiments described herein have the first, third and fifth layer oriented in the machine direction, and the hollow elastic members of the second and fourth layers oriented in the cross-machine direction, the layers can be interchangeably used, so long as there is at least one MD layer of tensile load bearing yarns to provide adequate strength and stretch resistance to the structure in use. For example, the first and fifth layers can be oriented in the cross-machine direction, and the hollow elastic members of the second and fourth layers in combination with the functional yarns of the third layer can be oriented in the machine direction. Similarly, the binder yarns 24 can be disposed in CD or MD, or both, as required.

Layers 12, 16, 20, 26 and 28 are not interwoven, as illustrated in FIG. 4A. Instead one or more relatively thin threads or binder yarns 24 are used to bind the layers vertically together. For example two threads, 24' and 24" may be used to bind the yarns of the center or middle layer to the top and bottom layers respectively. This type of construction insures that the individual yarns of the layers do not shift laterally. Binder yarns 24' and 24" can alternate from one row to another, each row extending in a cross-machine direction, for example.

According to another embodiment of the invention, all the structures described above can be employed to produce spiral wound strips of material as taught in U.S. Pat. No. 5,360,656, the entire content of which is incorporated herein by reference.

All the structures above can be made endless in the machine direction. They can also have a seam to allow on-machine seaming capability. One method to make such a seam in "crossless" structures is taught in U.S. Pat. No. 4,979,543, the entire content of which is incorporated herein by reference.

Again it is important to note that the layer of hollow elastic members can be employed in either the MD or CD layers, or in both MD and CD layers, as long as there is at least one MD layer of tensile load bearing yarns to provide adequate strength and stretch resistance to the structure in use.

Also the degree of compression/resiliency is controlled by the elasticity of the required elastic members, number of layers of the elastic members, size, shape and number of elastic members in each layer of the elastic members, and of course the totality of the structure itself. The inventive structure can also be part of a laminate with other yarn arrays or base fabrics attached thereto.

Figure 5:
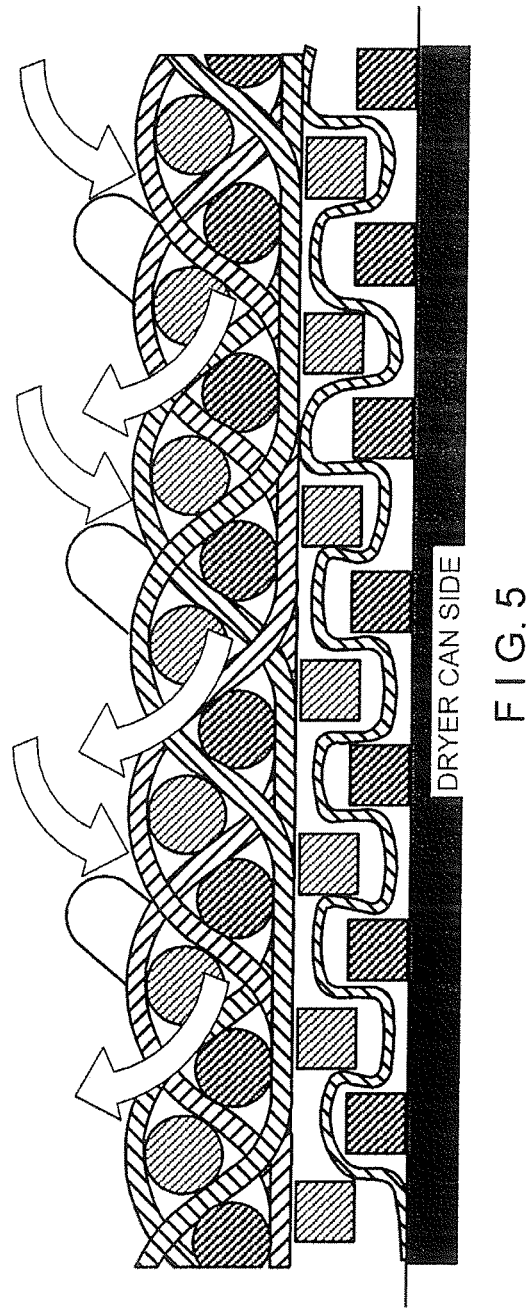
FIG. 5 is a dryer fabric, according to a further embodiment of the invention.

Moreover, in the case of a dryer fabric, the three layer embodiment, shown in the figures, may be particularly advantageous in that as the fabric structure passes around a roll, for example a dryer can, the yarns in the dryer fabric will at least partially nest improving contact area of the paper sheet to the dryer can surface and therefore improve heat transfer. This would be caused by a temporary increase in MD tension as the dryer fabric passes around a roll and not due to any applied load normal to the fabric. The invention, according to another embodiment, is a support layer of a dryer fabric, where the inventive fabric forms the sheet side component of the dryer fabric, such as shown in FIG. 5. In this fabric, the "angled" or backside is the non-sheet contact side of the fabric. This side "chops up" laminar flow and induces "vertical flow" in the dryer pocket, and reduces axial (to the side) or CD direction air flow, and helps mass transfer. In such an arrangement, the support fabric compresses on the dryer can, increasing sheet contact area with the can and therefore improves heat transfer.

Therefore, the embodiment forms an improved dryer fabric with an engineered sheet side for heat transfer promotion and optimization, and engineered backside for mass transfer promotion and optimization. The structure can be an integrally woven structure, a laminate or a combination of both.

In yet another embodiment, the fabric may be woven, and the layers of the fabric may each be formed by mixing different weave repeats or shed patterns. By way of background, in flat weaving, a warp, or MD, yarn is threaded through a heddle, and the weave pattern is created by raising and lowering the heddle position for each yarn in the warp direction before the weft or pick is inserted into the shed created by raising or lowering the warp yarns or MD yarns. The number of yarns intersected before a weave pattern repeats is known as a shed. With this understanding, a plain weave utilizes, for example two sheds in a loom for changing the warp yarn positions, and can therefore be termed a two shed weave pattern. Accordingly the fabric of the present invention can be constructed using a 2, 4, 6 or 8 shed weave pattern, and so on.

Figure 6:
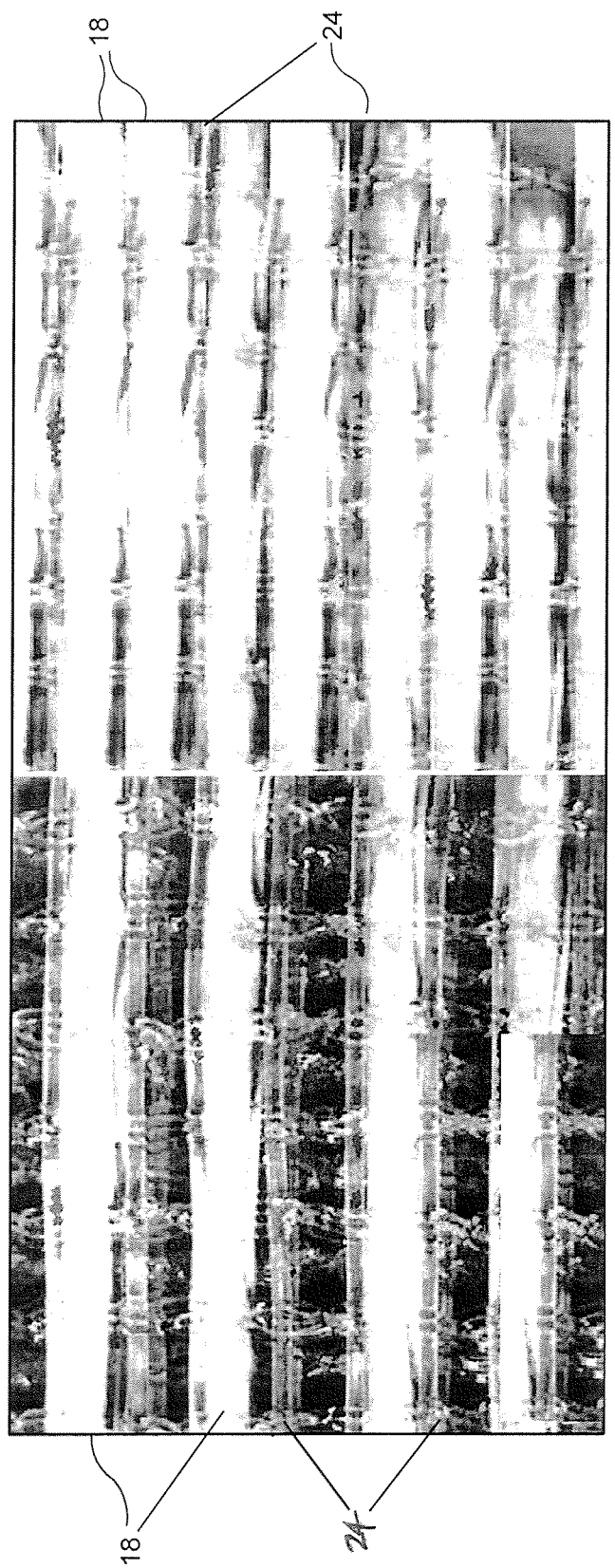
FIG. 6 is top view of another embodiment of the invention.

FIG. 6 shows a 2-shed weave pattern, for example, with a 0.35 mm MD yarn; the figure showing two differing densities for the hollow elastomeric yarn 18 and the binder yarn 24. For weaving a 2-shed surface for, for example, a 5-layer fabric with a hollow elastic member 18, a 16 harness (16/4=4, 4/2=2 shed) pattern can be used. In one exemplary design, the top pattern can be a 2-shed for the loop yarns for an on-machine seamable version of the fabric. The on-machine seamable fabric can be formed using the method disclosed in U.S. Pat. No. 3,815,645, the entire content of which is incorporated herein by reference. The pick count for the loop yarn in 2-shed can be the same as that in, for example, 4-shed patterns, in order to maintain the loop strength. In another example, a 2-layer, 4/8-shed weave can have a 4 ply Lycra® or Estane® hollow elastic member as a weft. Alternatively, the fabric of the present invention, according to one embodiment, can be woven endless or seamless in that the functional yarns, which lay in MD, may be inserted as wefts or picks in a continuous manner, and the layer(s) of the hollow elastic members and binder yarns may comprise the warp yarns of the fabric.

Figure 7:
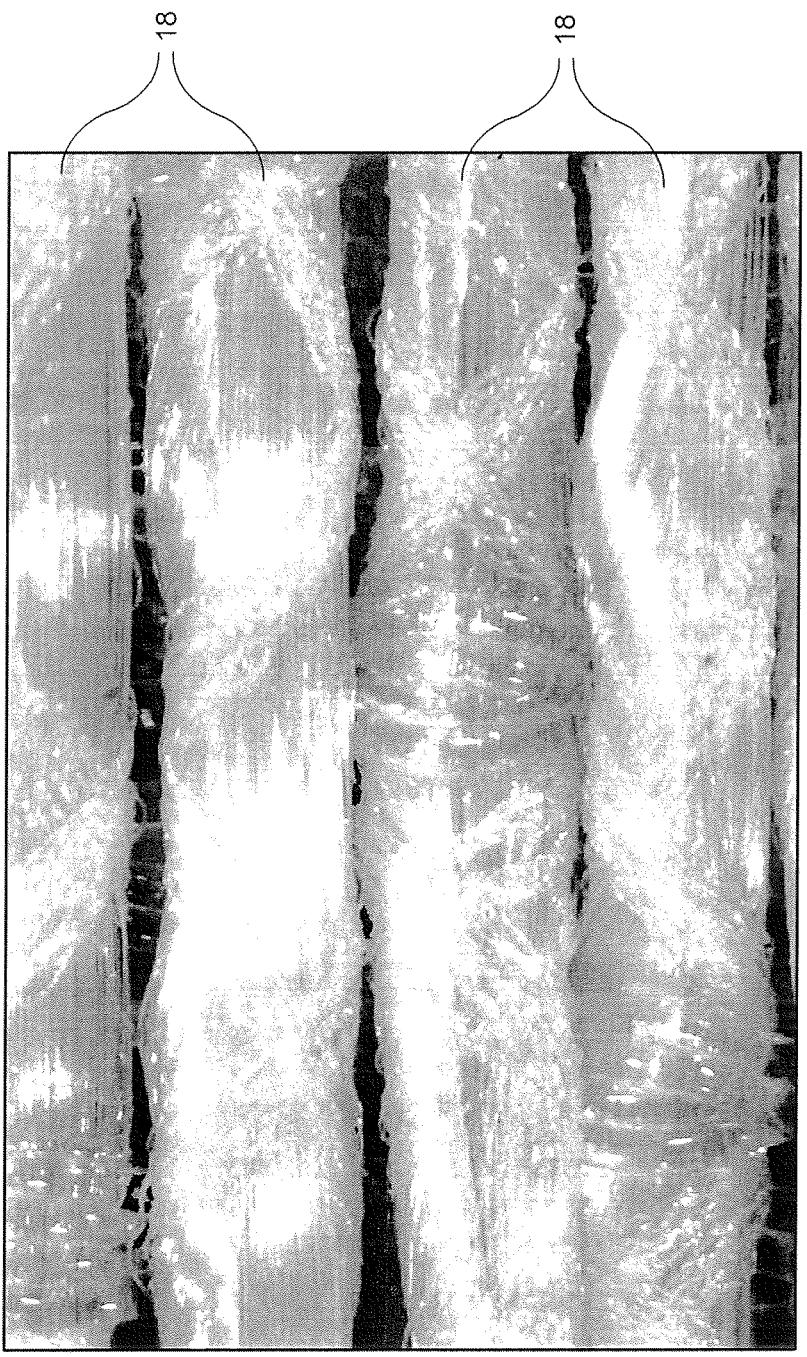
FIG. 7 illustrates another embodiment showing a multi-component wound member comprising the hollow elastic material for a fabric having a 2 layer construction.
Figure 8A:
FIG. 8A shows an embodiment of a laminated fabric.

Illustrating other embodiments of the fabric, in FIG. 7 is shown a multi-component wound hollow elastic member comprising elastic material 16 for a fabric having a 2 layer construction. In FIG. 8 are shown embodiments of laminated structures of the fabric. FIG. 8A shows a base fabric with the hollow elastic member 18 and functional yarns 14, 22 laminated between two fabrics.

Figure 8B:
FIG. 8B shows a woven "crossless" base fabric.

FIG. 8B shows a woven "crossless" base. The base shows the hollow elastic member 18 and the functional yarns 14 and 22 as well as a binder yarn 24. Also contemplated are other embodiments where the hollow elastic member can be a knitted member instead of a ply/twisted member.

Figure 9:
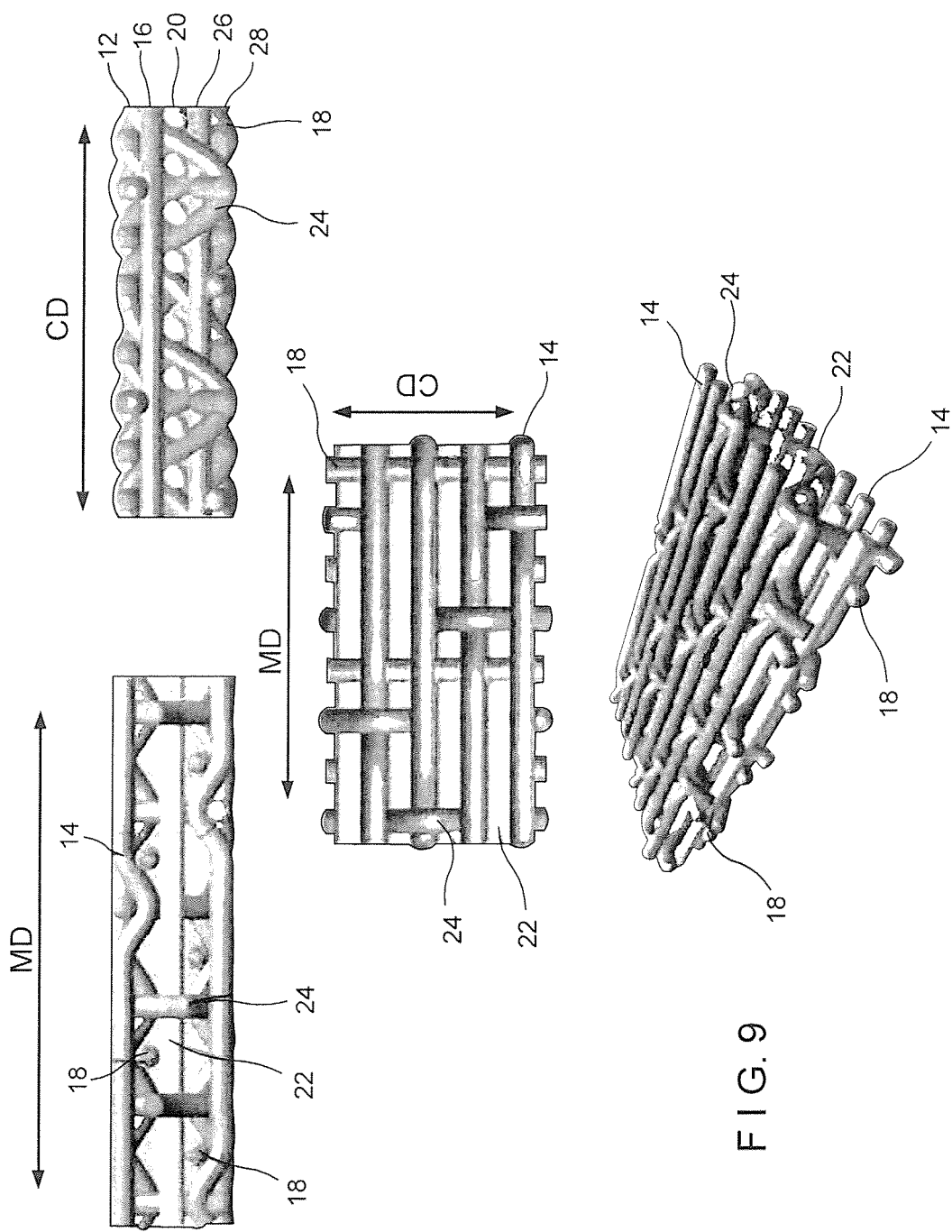
FIG. 9 shows a 5-layer compressible resilient fabric comprising a CD binder.

In another embodiment, FIG. 9 shows a 5-layer compressible resilient fabric comprising a CD binder 24. Member layer 16 including hollow elastic members 18 running in the CD is positioned between the first yarn layer 12 and the third yarn layer 20. A fourth layer 26 including hollow elastic members 18 has the members positioned such that they are in alternating spaces in the vertical plane from the parallel hollow elastic members of the second layer 16. The yarns 14 of the fifth layer 28 are in the same vertical plane as the yarns 14 of the first layer 12. As shown in the figures, each CD binder yarn 24 alternately weaves under and over three parallel yarns in the first and fifth layers, and is spaced in the MD such that long floats are created by each of the yarns 14 of the first layer 12 and the fifth layer 28. As shown, the hollow elastic members are inside a double layer weave construction, which can use 16 harnesses for endless weaving or 8 harnesses for flat weaving. The fabric woven in accordance with this embodiment can use single or monofilament warp yarns, or the 4 ply/twisted type warp yarns. It is also possible to use two different size warp yarns/members; a coarser (larger) warp including the hollow elastic member 18, and a smaller warp for the binder yarn 24. A fabric as shown in FIG. 9 can also be formed using two separate warp beams; for example, the coarser warp including the hollow elastic member 18 on one beam and the smaller warp including the binder yarn 24 on another beam. However, if two warp beams are not desired, the smaller binder yarns can be alternated with the hollow elastic warp members on the same beam.

The weave must be such that the hollow elastic members are allowed to stretch and compress, and the base compresses under a normal load then 'springs back' after removal of the load.

Figure 10:
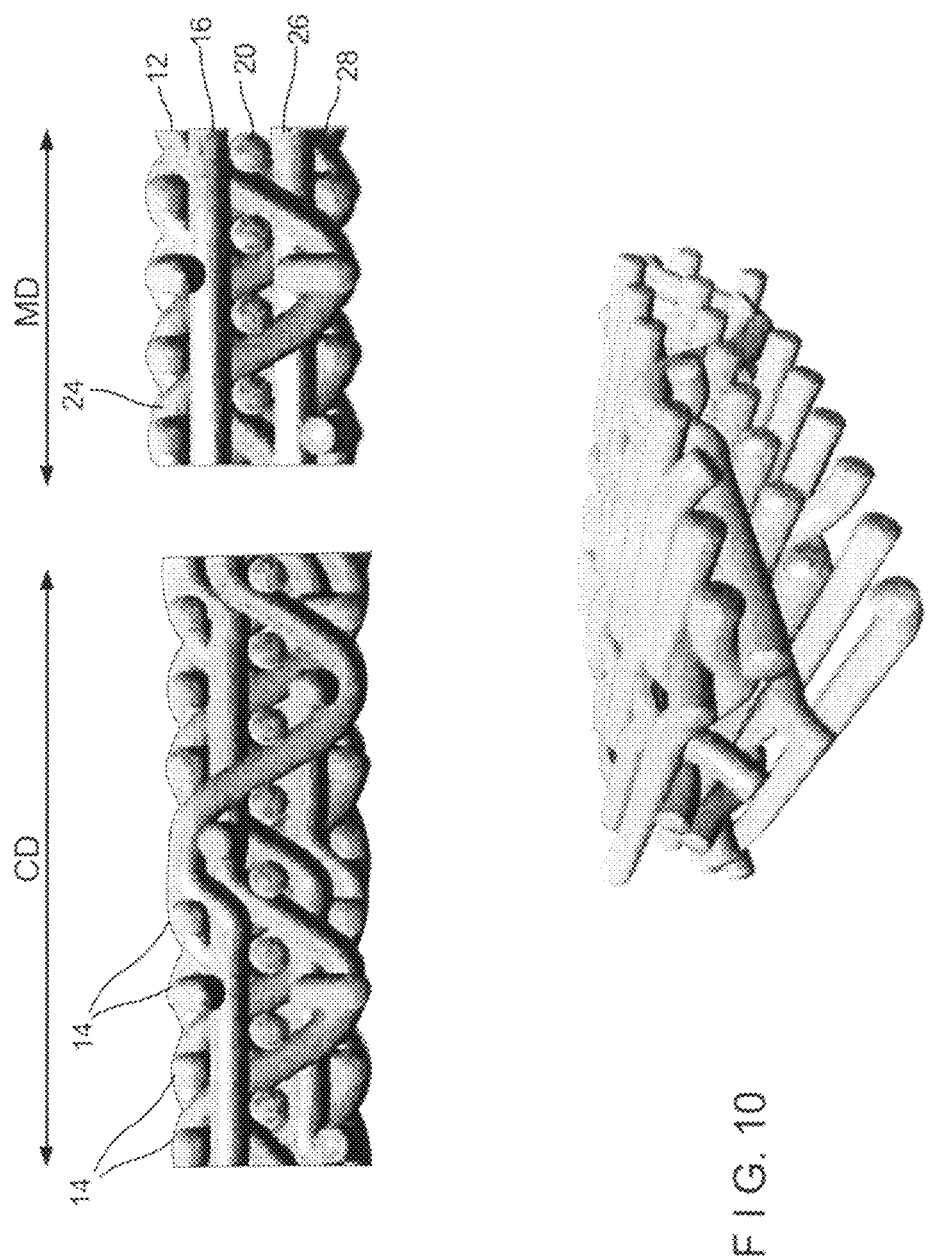
FIG. 10 illustrates another embodiment of the fabric.
Figure 11:
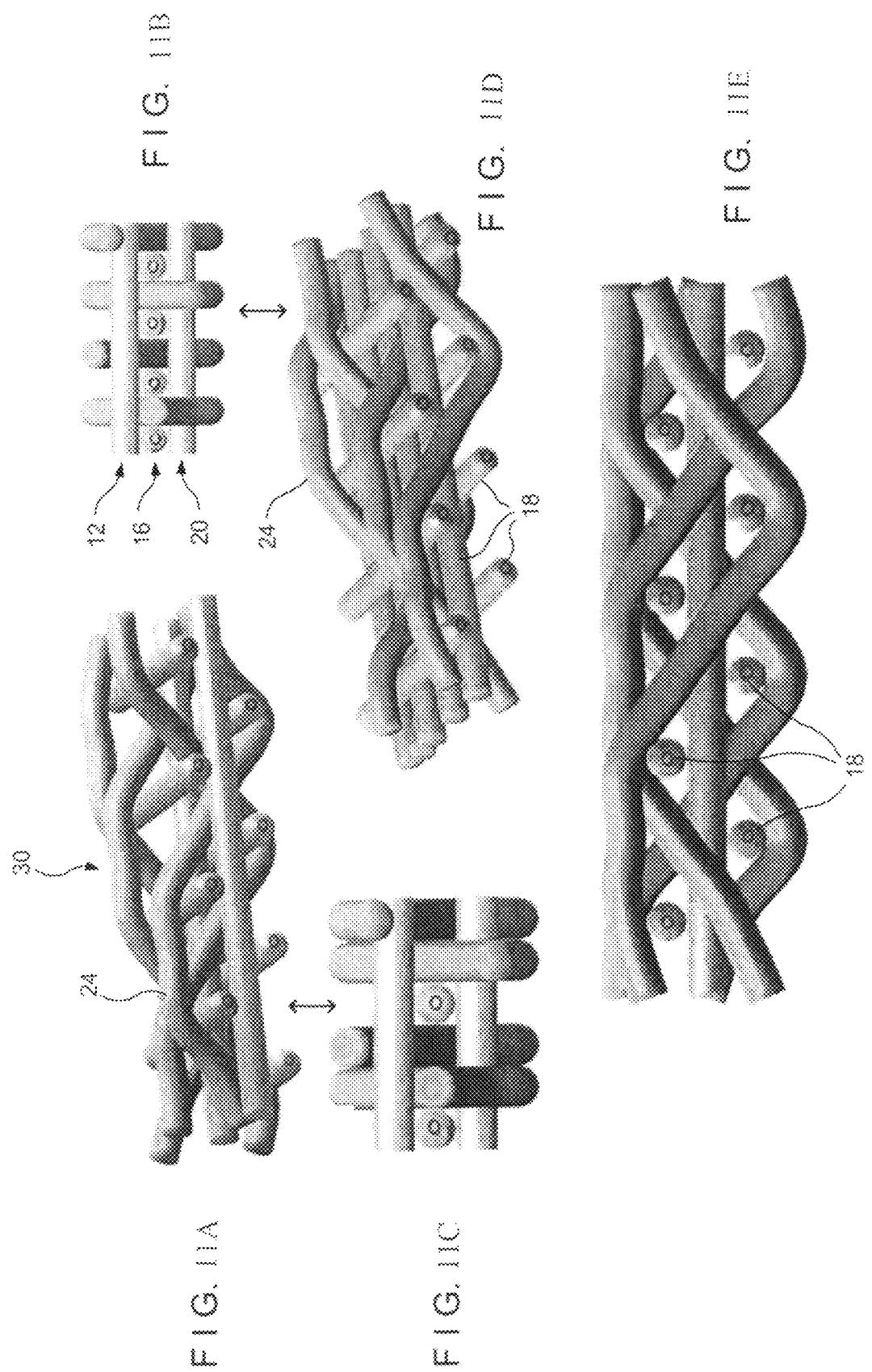
FIGS. 11A-11E show another interwoven variant of the embodied fabric.

FIG. 10 illustrates another embodiment. As shown therein four ends of yarns 14 in the first layer 12 weave above the layers 16, 20, 26 of hollow elastic members 18, and changes over to a two-layer binder every second repeat, and four ends of yarns 14 weaving under the layers 16, 20, 26 and changes over to a two-layer binder every second repeat. Each layer need not be composed of hollow elastic members. However, the fabric structure should include at least one layer of hollow elastic members to exhibit the 'spring back' nature desired.

Another variant of the embodied fabric is shown in FIGS. 11A-11E, configuring the fabric with more or less MD crimp weaves, and having the hollow elastic members in the interior layers. The Figures show three layers 12, 16, 20, of hollow elastic members 18; a top layer 12 and bottom layer 20 running in the CD and a middle layer 16 arrayed lengthwise in the MD. Loop or binder yarns 24 (for a on-machine seamable) run or weave through the structure as illustrated, where on the uppermost surface the yarns 24 extend over two of the top CD layer 12 hollow elastic members 18 and thread downward to loop under a single CD hollow elastic member 18 in the bottom layer 20 of arrayed hollow elastic members, whereupon it threads upward again. As shown, the binder yarns 24 are formed with a crimp 30, resulting in long floats on the surface of the fabric and small knuckles on the machine side or non-sheet contact side of the fabric. However, the weave and placement of the hollow elastic members must be such that the hollow elastic members compress upon a normal load being applied to the base fabric, and the base fabric 'springs back' upon removal of that load.

Modifications to the present invention would be obvious to those of ordinary skill in the art in view of this disclosure, but would not bring the invention so modified beyond the scope of the appended claims.

The invention claimed is:

1. A compressible resilient industrial fabric, wherein the fabric includes a structure having an original thickness, the structure comprising:
   a laminated structure further comprising;
   a plurality of substantially parallel cross-machine direction (CD) yarns;
   a plurality of substantially parallel machine direction (MD) yarns; and
   a plurality of substantially parallel hollow elastic members in CD and/or MD;
   a first layer of the parallel yarns running in either the CD or the MD direction;

a second layer of the hollow elastic members on one side of the first layer, the second layer's hollow elastic members running in the CD or MD direction different from that of the first layer; and a third layer of the parallel yarns on the opposite side of the second layer as the first layer and running in the same direction as those of the first layer, wherein the parallel yarns of the third layer are aligned such that the parallel yarns of the third layer nest between the parallel yarns of the first layer without interfering with one another to allow the structure to compact to form a planar structure in a through thickness direction when the fabric is under a compressive load, and wherein the hollow elastic members are elastic in their thickness or radial direction and length or axial direction such that under the compressive load the hollow elastic members stretch and compress to conform to the nesting and the structure springs back to substantially the original thickness after removal of the load, and wherein the fabric is formed in an endless structure in the form of a continuous loop.

2. The fabric of claim 1 wherein the number of yarns in the third layer is less than the number of yarns in the first layer.

3. The fabric of claim 1 wherein the hollow elastic members of the second layer are orthogonal to those of the first and third layers.

4. The fabric as claimed in claim 1, wherein the hollow elastic member is selected from the group consisting of: a monofilament, a multifilament, a plied monofilament or multifilament, a wrapped member of different materials, a knitted member, a twisted member, a multicomponent member, and a braided member.

5. The fabric as claimed in claim 1, wherein the hollow elastic member is selected from the group consisting of: a polyurethane and rubber.

6. The fabric as claimed in claim 1, wherein the hollow elastic member is selected from members having a cross-section of differing geometric configurations.

7. The fabric as claimed in claim 6, wherein the hollow elastic member is selected from the group consisting of: circular, non-circular, square, rectangular, triangular, elliptical, polygonal, trapezoidal and lobate.

8. The fabric as claimed in claim 1, wherein the hollow elastic member has one or more holes running along a length or axial direction thereof.

9. The fabric as claimed in claim 8, wherein the one or more holes are selected from the group consisting of: circular, non-circular, square, rectangular, triangular, elliptical, trapezoidal, polygonal, and lobate.

10. The fabric of claim 1 wherein the layer of hollow elastic members is inside a double layer construction.

11. The fabric of claim 1 wherein the fabric is selected from the group of fabrics including:
    paper machine clothing;
    a forming fabric;
    a press fabric;
    a dryer fabric;
    a through air dryer fabric;
    a shoe press belt base;
    a calendar belt base;
    an engineered fabric base;
    a transfer belt base;
    a belt used in the production of nonwovens by processes such as airlaid, melt blowing, spunbonding, and hydroentangling; and
    an industrial process belt such as a textile finishing belt.

* * * * *